(12) United States Patent
Adelmann

(10) Patent No.: US 7,133,322 B2
(45) Date of Patent: Nov. 7, 2006

(54) PROBE STORAGE DEVICE

(75) Inventor: Todd C. Adelmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 10/878,263

(22) Filed: Jun. 28, 2004

(65) Prior Publication Data

US 2005/0286321 A1 Dec. 29, 2005

(51) Int. Cl.
*G11C 7/02* (2006.01)
(52) U.S. Cl. .................... 365/206; 365/211
(58) Field of Classification Search ........... 365/206, 365/211
See application file for complete search history.

(56) References Cited

U.S. PATENT DOCUMENTS

| | | | |
|---|---|---|---|
| 5,038,322 A | | 8/1991 | Van Loenen |
| 5,289,408 A | | 2/1994 | Mimura et al. |
| 5,317,533 A | | 5/1994 | Quate et al. |
| 5,835,477 A | | 11/1998 | Binnig et al. |
| 6,819,587 B1 | * | 11/2004 | Sharma .................. 365/173 |
| 6,977,839 B1 | * | 12/2005 | Sharma .................. 365/173 |
| 2002/0003211 A1 | | 1/2002 | Kley |
| 2002/0125789 A1 | | 9/2002 | Brandt |
| 2003/0032290 A1 | | 2/2003 | Lee et al. |
| 2003/0185139 A1 | | 10/2003 | Ives |
| 2003/0185140 A1 | | 10/2003 | Ives |
| 2003/0202288 A1 | | 10/2003 | Ives et al. |
| 2004/0105323 A1 | * | 6/2004 | Giovanni .................. 365/200 |

OTHER PUBLICATIONS

"A Nanotechnology-based Approach to Data Storage" by E. Eleftheriou, P. Bachtold, G. Cherubini, A. Dholakia, C. Hagleitner, T. Loeliger, A. Pantazi, and H. Pozidis, IBM Research, Zurich Research Laboratory, Proceedings of the 29th VLDB Conference, Berlin, Germany, 2003.

"Millipede—MEMS-based Scanning-Probe Data-Storage System", by E. Eleftherious, T. Antonakopoulos, G.K. Binnig, G. Cherubini, M. Despont, A. Dholakia, U. Durig, M.A. Lantz, H. Pozidis, H.E. Rothuizen and P. Vettiger, IEEE Transactions on Magnetics, vol. 39, No. 2, Mar. 2003, pp. 938-945.

Micro Scanning Probe Array Memory, by Mathieu Bolks, Ferdy Hanssen, Leon Abelmann, Paul Havinga, Pieter Hartel, Pierre Jansen, Cock Lodder, Gerard Smit, Department of Computer Science, University of Twente, The Netherlands.

* cited by examiner

*Primary Examiner*—Tuan T. Nguyen

(57) ABSTRACT

A probe storage device includes an array of memory storage locations, an array of probes proximate to the array of memory storage locations, and a data density controller coupled to the array of probes. Each probe of the array of probes has a distal tip that is positioned within close proximity to a memory storage location. The probes are movable relative to the array of memory storage locations. The data density controller optionally groups the probes into at least one subset of probes. Each probe of a subset interacts identically and contemporaneously with a corresponding subset of memory storage locations.

33 Claims, 9 Drawing Sheets

FIG. 12　SWITCH 152

PROBE STORAGE DEVICE

BACKGROUND

Increasing demand for higher capacity, lower cost data storage has pushed the technologies of silicon-based semiconductor memory chips and magnetic hard disk drives (HDDs) towards their theoretical limits. HDDs have dominated the data storage market, and have increased storage densities at a rate of 60–100% per year. However, the area density that may be achieved by current magnetic recording technology will eventually reach a limit, imposed by a known superparamagnetic effect believed to be in the order of 250 Gbit/in$^2$ for longitudinal recording.

Atomic force and scanning tunneling microscopes use nanometer sized tips for imaging and investigating the structure of materials down to atomic levels. These devices have led to the development of ultrahigh density storage devices that utilize micro electro mechanical system (MEMS) based arrays of tips that write, read and erase data on a recording medium using magnetic, optical, electric and/or thermal processes. For example, these tips may utilize a magnetic or physical method of marking or otherwise changing the recording medium to write or erase a data element. Retrieval of the data element at a later time is accomplished using the same or similar tips to detect the mark or change in the recording medium.

As appreciated, a thermal probe storage device has a plurality of probes that may contemporaneously write to, and contemporaneously read from, storage locations of a polymer substrate.

FIG. 1 is a graph 50 showing an exemplary temperature signal 52 of the thermal probe storage device. More specifically, the graph 50 of temperature signal 52 represents the temperature of a distal tip during a read process of memory storage locations located on a polymer substrate. Signal 52 includes random noise, and is typical of a signal resulting from the distal tip moving across the polymer substrate at a speed $S_1$. An ideal signal 54 is shown for reference.

A time period 60, between lines 56 and 58, represents a deflection in temperature signal 52 caused by increased heat energy transfer when the distal tip is within a pit in the polymer substrate that represents a bit of data (e.g., a pit may represent a '1' value and no pit may represent a '0' value). Two exemplary threshold levels 62 and 64 indicate detection levels (including hysteresis) that may be used to determine if the distal tip is reading a '1' value (e.g., the distal tip is within a pit), or if the distal tip is reading a '0' value (e.g., the distal tip is not within a pit).

FIG. 2 is a graph 70 illustrating an exemplary temperature signal 72, representing the temperature of the distal tip passing across memory storage locations of the polymer substrate at an increased speed $S_2$. An ideal signal 74 is shown for reference. Signal 72 includes random noise and is typical of a signal resulting from the distal tip moving across the polymer substrate at speed $S_2$. A time period 80, between lines 76 and 78, represents a deflection in temperature signal 72 caused by increased heat transfer from the distal tip to the polymer substrate when the distal tip is within a pit.

As the distal tip travels across the polymer substrate at the increased speed $S_2$, an amount of time (indicated by period 80 between lines 76 and 78) that the distal tip remains within a pit is reduced, as compared to period 60, FIG. 1. The amount of heat loss to the polymer substrate while the distal tip is within the pit is reduced, and hence the change in temperature of the distal tip is also reduced.

Two exemplary threshold levels 82 and 84 indicate detection levels that may be used to determine if the distal tip is within a pit. As seen in graph 70, the deflection in temperature signal 72 is reduced to a level that is less than the noise level on temperature signal 72. In other words, the signal to noise ratio (SNR) of temperature signal 72 is insufficient to allow consistent detection of data during reading of memory storage locations of the polymer substrate at the increased speed $S_2$.

As appreciated, there is a maximum read speed (e.g., speed $S_1$) at which the thermal probe storage device will correctly operate. This maximum read speed is significantly slower than bit read rates for current hard disk drives. However, data transfer read (and write) rates for the probe storage device are increased due to the parallelism of design. In one example, a probe storage device includes 1024 probes and thereby each bit read operation (e.g., period 60, FIG. 1) returns 1024 bits of information. In comparison, a hard disk drive may, for example, have 16 read heads and therefore return 16 bits of information per hard disk drive read period.

To improve performance of probe storage devices it is desirable to increase read speeds. Hence, there is a need for a probe storage device that overcomes one or more of the drawbacks identified above.

SUMMARY OF THE INVENTION

The present disclosure advances the art and overcomes problems articulated above by providing a probe storage device with a data density controller.

In particular, and by way of example only, according to one embodiment, the present invention provides a probe storage device with an array of memory storage locations; an array of probes proximate to the array of memory storage locations, each probe having a distal tip, each tip positioned within close proximity to a memory storage location, the probes movable relative to the array of memory storage locations; and at least one data density controller coupled to the array of probes, the data density controller optionally grouping the probes info at least one subset of probes, each probe of a subset interacting identically and contemporaneously with a corresponding subset of memory storage locations.

DETAILED DESCRIPTION OF THE FIGURES

Before proceeding with the detailed description, it is to be appreciated that the present teaching is by way of example, not limitation. The concepts herein are not limited to use or application with a specific type of probe storage device. Thus, although the instrumentalities described herein are for the convenience of explanation, shown and described with respect to exemplary embodiments, it will be appreciated that the principals herein may be equally applied in other types of probe storage device.

Although the following examples relate to a thermal and physical method of writing and reading data to and from a substrate within a probe storage device, other methods of writing and reading (e.g., combinations of magnetic, optical, electric and thermal processes, with or without actual physical deformation of the substrate) also benefit from the methods described herein. For example, the substrate may be a photo reactive polymer and the probes may emit and receive light. Or, in another example, the substrate may be a magnetic material that stores data bits as alternating fields and the probes may be magnetic field sensors. Or, in another example, the substrate is a phase change material that stores data bits as phase changes and the probes are electron beam sources that detect phase changes in the phase change material. In each example, the functional operation and advantages achieved by the invention described herein are still the same.

To be able to decrease the bit-read period of the probe storage device, the signal to noise ratio (SNR) of a read signal must be increased to allow an array of probes to move at a higher speed across an array of memory storage locations. One method of improving the SNR involves contemporaneously using multiple tips in an array for a single data bit. Multiple pits are created in the polymer substrate during a write operation of the single data bit, and therefore multiple pits are detected during a read operation of the single data bit; the signals from each of the multiple tips reading the same data bit are summed (or combined using a mathematical algorithm) to increasing the SNR.

Figure 1:
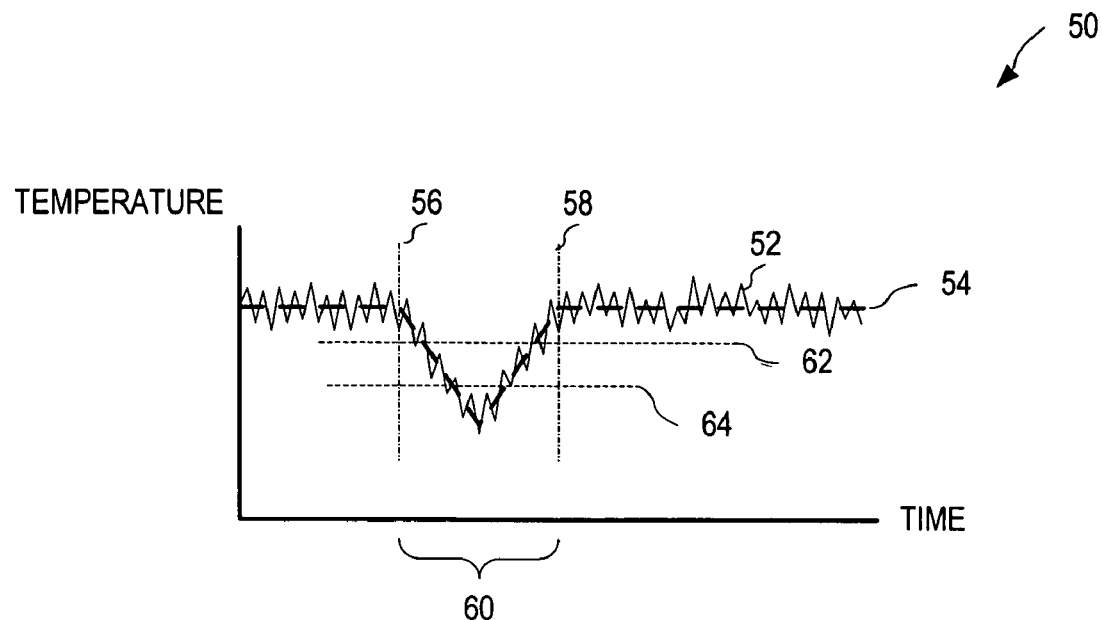
FIG. 1 is a graph showing a temperature signal that represents the temperature of the distal tip during a read process of a thermal probe storage device.
Figure 2:
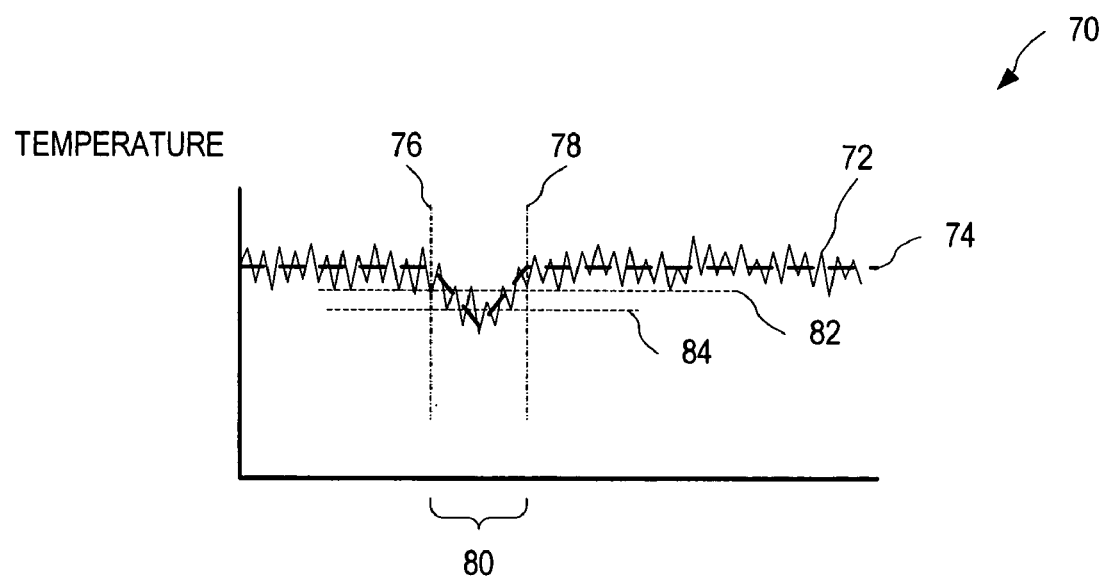
FIG. 2 is a graph illustrating a temperature signal that represents the temperature of the distal tip during a read process of increased speed.
Figure 3:
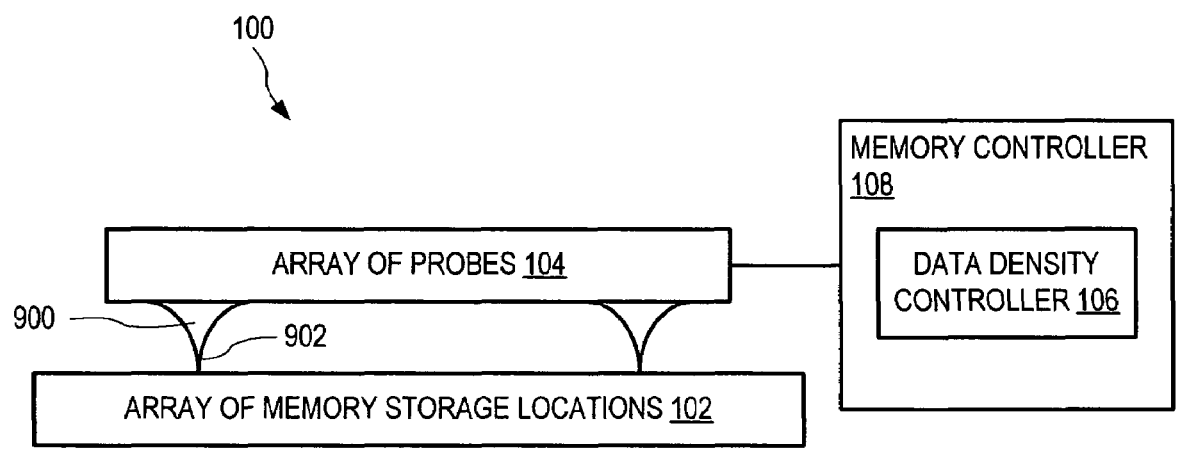
FIG. 3 shows a probe storage device that has an array of memory storage locations, an array of probes, a data density controller and a memory controller.

FIG. 3 shows a probe storage device 100 having an array 102 of memory storage locations 112 (shown in FIG. 4), an array 104 of probes 900 and a data density controller 106. The array 104 is proximate to the array 102 of memory storage locations 112. In addition, each probe 900 within array 104 has a distal tip 902, each distal tip 902 being positioned within close proximity to one memory storage location 112. More specifically, each distal tip 902 is disposed close enough to the memory storage location 112 so as to achieve a desired read or write operation. Although only one array 104 (of probes 900) and array 102 (of memory storage locations 112) is shown, probe storage device 100 may include multiple pairs of arrays 104 and 102, and each pair may operate independently.

The data density controller 106 is capable of directing the operation of the probes 900 within array 104 to act autonomously or as collective groups. More specifically, data density controller 106 optionally groups the probes 900 within array 104 into at least one subset of probes 904 (see FIG. 11) as is further discussed and describe below. A suitable data density controller 106 may comprise analog circuitry, a digital processor, a CPU programmed with control logic, a device driver and/or combinations thereof.

The data density controller 106 is operable in harmony with a memory controller 108 that is capable of directing the physical operation and movement of probes 900 within array 104 as grouped by the data density controller 106. Under appropriate circumstances, the data density controller 106 and memory controller 108 may be combined into one control device, as shown. In alternative embodiments, the data density controller 106 and memory controller 108 may exist as physically separate components in electrical communication with each other.

Figure 4:
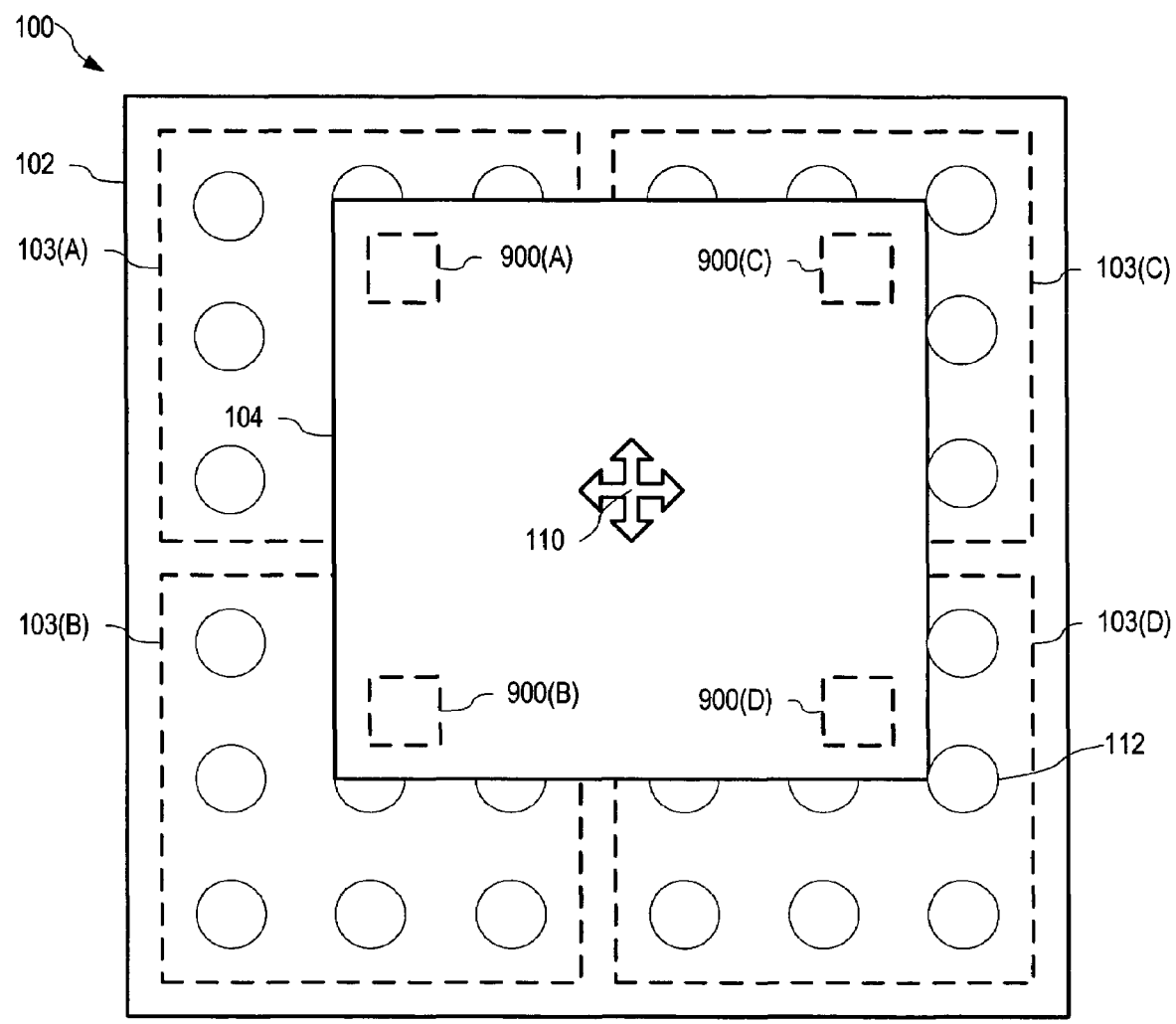
FIG. 4 shows a top view of the array of memory storage locations and the array of probes of the storage device of FIG. 3.

FIG. 4 shows a top view of array 102 of memory storage locations 112, and array 104 of probes 900 of storage device 100, FIG. 3. Array 102 of memory storage locations 112 is sub-divided into sub-arrays 103(A), 103(B), 103(C) and 103(D). Array 104 of probes 900 includes probes 900(A), 900(B), 900(C) and 900(D), where probe 900(A) is proximate to sub-array 103(A), probe 900(B) is proximate to sub-array 103(B), probe 900(C) is proximate to sub-array 103(C), and probe 900(D) is proximate to sub-array 103(D).

Array 104 of probes 900 moves in an orthogonal manner (as indicated by arrow 110) relative to array 102 of memory storage locations 112. More specifically, the relative movement between array 104 of probes 900 and array 102 of memory storage locations 112 is such that probes 900(A), 900(B), 900(C) and 900(D) may access memory storage locations 112 within sub-arrays 103(A), 103(B), 103(C) and 103(D), respectively and in parallel operation. In an alternative embodiment, array 104 of probes 900 may also move diagonally relative to array 102 of memory storage locations 112.

Figure 5:
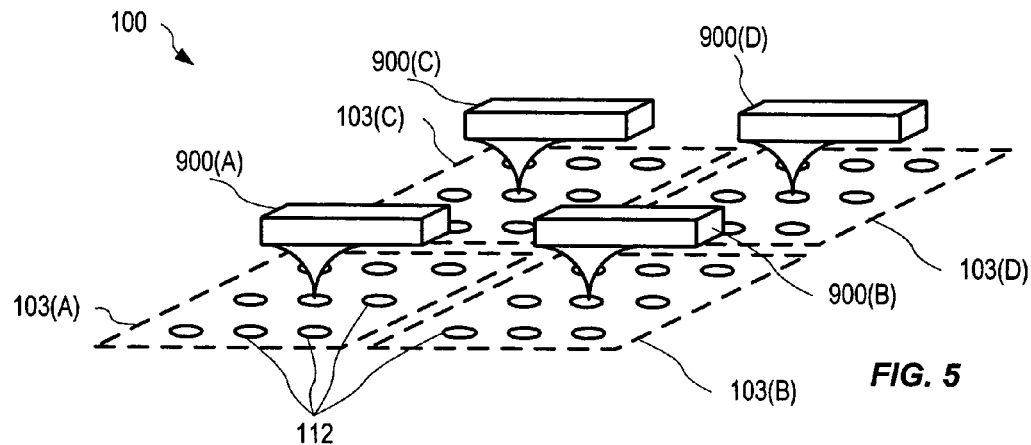
FIG. 5 is a block diagram illustrating four exemplary probes proximate to four exemplary sub-arrays of the probe storage device of FIG. 3.

FIG. 5 is a perspective view of prior art probe storage device 100, FIG. 4, illustrating four probes 900(A), 900(B), 900(C) and 900(D) proximate to four sub-arrays 103(A), 103(B), 103(C) and 103(D), respectively. Sub-arrays 103(A), 103(B), 103(C) and 103(D) are each shown with nine memory storage locations 112. As appreciated, sub-arrays 103(A), 103(B), 103(C) and 103(D) may contain more or fewer memory storage locations 112.

Figures 6, 7, 8:
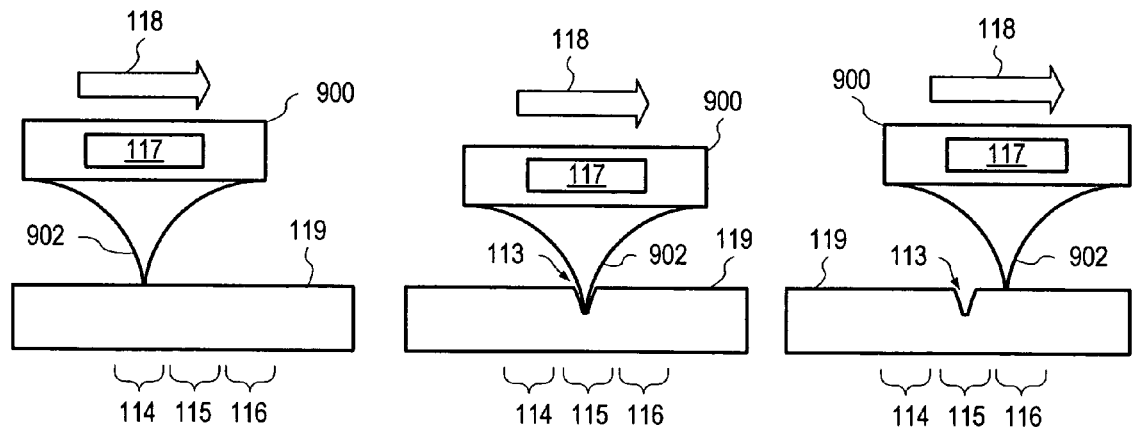
FIG. 6 shows one exemplary probe with a distal tip and a heating element.
FIG. 7 shows the probe and distal tip of FIG. 6 positioned to heat a storage location.
FIG. 8 shows the probe and distal tip of FIG. 6 positioned adjacent to another memory storage location.

FIGS. 6, 7 and 8 show one exemplary thermal deformation write process to store data to a polymer substrate 119. Polymer substrate 119 is, for example, part of array 102 of memory storage locations 112, FIG. 4. To illustrate a thermal deformation write process, FIG. 6 shows one exemplary probe 900 with distal tip 902 and a heating element 117. Probe 900 is, for example, one of probes 900(A), 900(B) or 900(C), shown in FIG. 4. The relative motion of probe 900 across memory storage locations 114, 115 and 116 of polymer substrate 119 is indicated by arrow 118. In this example, probe 900 creates a pit 113 in polymer substrate 119 at memory storage location 115 to store a binary '1' value.

Polymer substrate 119 is initially smooth (i.e., does not contains pits 113) at memory storage locations 114, 115 and 116. For these examples, the initial value of each storage location is conventionally a binary "0." In one example, memory storage locations (e.g., memory storage locations 114, 115 and 116) are erased by positioning distal tip 902 at the memory location to be erased, heating distal tip 902 using heating element 117, and then lifting distal tip from the memory location to allow molten material of polymer substrate 119 to refill the pit.

In another example, polymer substrate 119 is divided into one or more areas or blocks that each include a heating element. Each block may coincide with a sub-array. More specifically, each sub-array 103(A), 103(B), 103(C) and 103(D) may be provided its own heating element, be grouped to share a heating element or be provided with multiple heating elements. When one or more heating elements are activated for a selected block/sub-array 103(A), 103(B), 103(C) and 103(D), the polymer substrate 119 is melted and re-flowed to erase all memory storage locations (i.e., memory storage locations 114, 115 and 116) within the block. In yet another example, array 102 of memory storage locations 112 is heated to erase all memory storage locations 112 (i.e., memory storage locations 114, 115 and 116) of probe storage device 100 simultaneously.

FIG. 6 shows distal tip 902 moving across memory storage location 114. Heating element 117 is not activated and therefore no pit is created at memory storage location 114. Memory storage location 114 is thus unmodified and remains at the '0' value.

In FIG. 7, probe 900 and distal tip 902 are shown moving across memory storage location 115. At this instant, a pulse of current is passed through heating element 117, which heats distal tip 902 to a temperature sufficient to deform polymer substrate 119 to form a pit 113, as shown. Physical dissention of distal tip 902 into the substrate 119 may or may not occur, depending upon design requirements, but is shown in this example for illustrative purposes. Thus, pit 113 at memory storage location 115 represents a '1' value, in this example.

FIG. 8 shows distal tip 902 of probe 900 moving across memory storage location 116. Heating element 117 is not activated and therefore memory storage location 116 is unmarked and represents a '0' value in this example. Memory storage locations 114, 115 and 116 are thus 'written' with data values '0', '1' and '0', respectively.

Figures 9, 10:
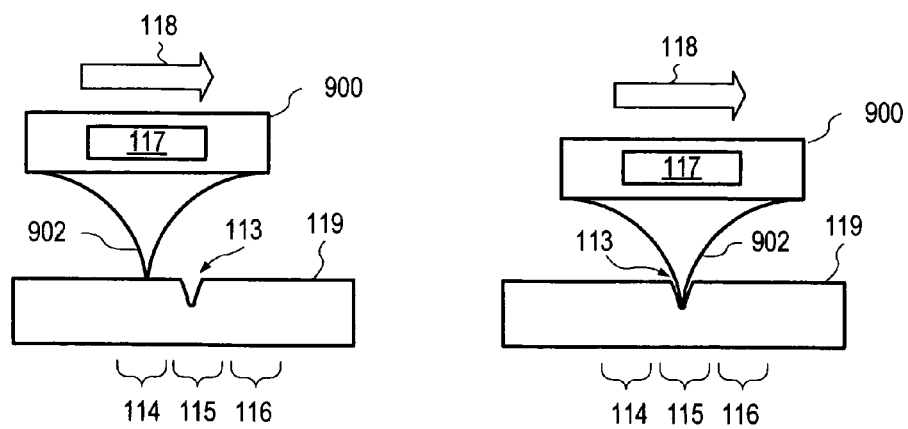
FIG. 9 shows the probe and distal tip of FIG. 6 at a first memory storage location as it moves across the polymer substrate.
FIG. 10 shows the probe and the distal tip as the probe crosses proximate to a second memory storage location.

FIGS. 9 and 10 show one exemplary read process for a probe storage device that utilizes a thermal detection method of reading physical deformations of polymer substrate 119 that were created by the write process of FIGS. 6, 7 and 8. Specifically, FIG. 9 shows distal tip 902 of probe 900 moving across memory storage location 114 of polymer substrate 119, as indicated by arrow 118.

A constant voltage is supplied to heating element 117 so that current passing through heating element 117 supplies heat at a constant rate to distal tip 902, and such that the temperature of distal tip 902 is less than the temperature at which polymer substrate 119 may be deformed, but is also above the ambient temperature of polymer substrate 119. Heat energy is therefore transferred from distal tip 902 to polymer substrate 119 (and other matter surrounding distal tip 902) at a rate $R_1$, for example, due to the contact between distal tip 902 and memory storage location 114.

As distal tip 902 moves across memory storage location 114, heat energy transfer remains constant (i.e., at rate $R_1$), and temperature of distal tip 902 also remains constant. Since resistance of heating element 117 varies with temperature, a temperature of distal tip 902 may be determined by measuring current through heating element 117 (assuming the supply voltage to heating element 117 is constant and/or known).

FIG. 10 shows distal tip 902 of probe 900 moving across memory storage location 115. Distal tip 902 follows the surface of polymer substrate 119 into pit 113, as shown. For example, when distal tip 902 is located within pit 113, distal tip 902 has a greater contact area with polymer substrate 119 and heat energy transfers to polymer substrate 119 at an increased rate $R_2$. Since heating element 117 supplies heat energy to distal tip 902 at a constant rate, temperature of distal tip 902 decreases when distal tip 902 is in pit 113 due to the increased heat transfer rate $R_2$. Thus, pit 113 is detected at memory storage location 115 by detecting the temperate change in distal tip 902.

Figure 11:
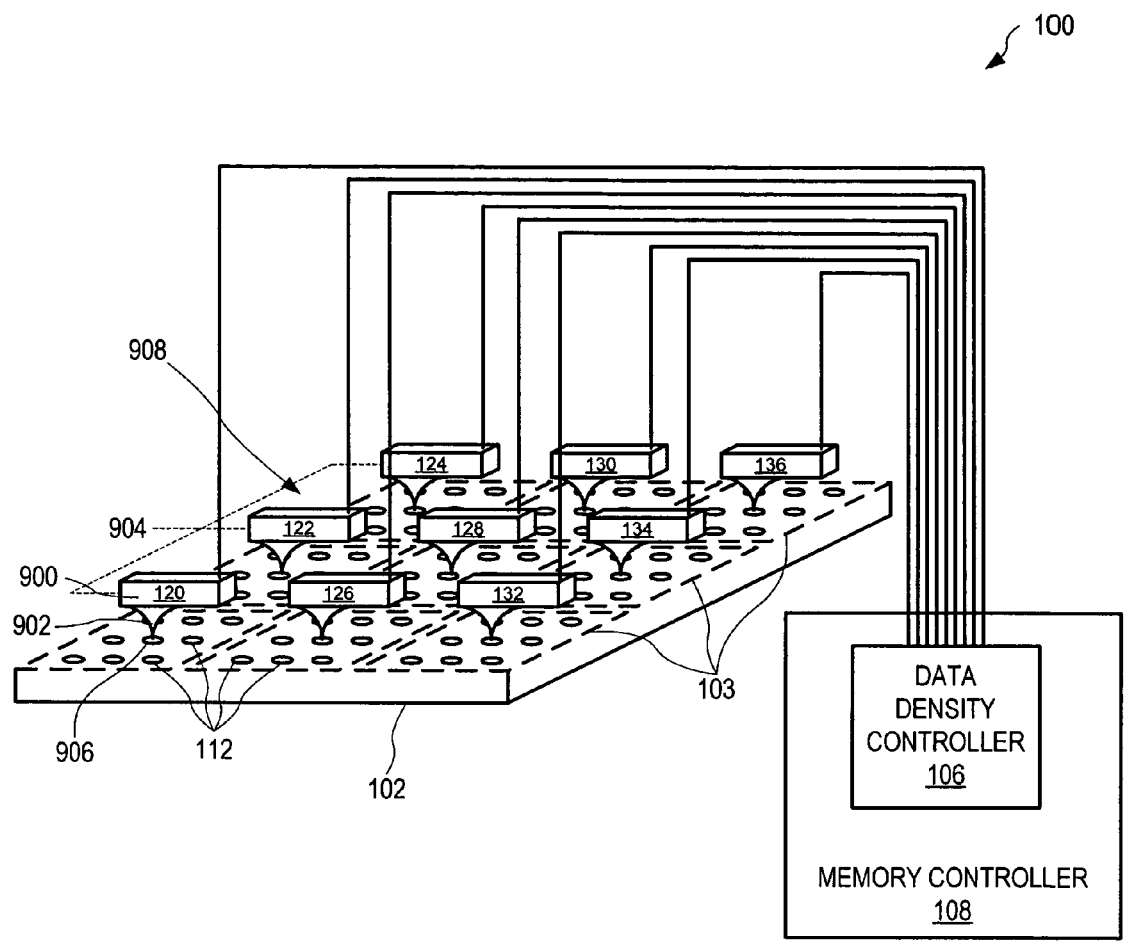
FIG. 11 shows the probe storage device of FIG. 10 with array of memory storage locations shown divided into nine sub-arrays, each shown with nine memory storage locations.

FIG. 11 shows probe storage device 100, FIG. 3, with array 102 of memory storage locations 112 shown divided into nine sub-arrays 103, each shown with nine memory storage locations 112. Nine probes 120, 122, 124, 126, 128, 130, 132, 134 and 136 (collectively, probes 908) represent array 104, FIG. 3.

The array 104 is movable relative to the array 102 of memory storage locations 112. More specifically, in at least one embodiment, array 104 is fixed and array 102 of memory storage locations 112 is movable. In an alternative embodiment, array 104 is movable and array 102 of memory storage locations 112 is fixed. Each probe within array 104 is operable to read or write a data bit to or from a memory storage location 112.

In at least one embodiment, the probes 908 within the array 104 are fixed relative to each other. The probes 908 within array 104 track in parallel over the plurality of sub-arrays 103. The relative position of a specific probe 120 passing over specific memory storage location 906 is mirrored by the other probes 122~136 passing over other memory storage locations. In other words, when distal tip 902 of probe 120 is upon specific memory storage location 906, the distal tips of probes 122~136 substantially mirror distal tip 902 with respect to other memory locations. The operation of each of probes 908 within array 104 is controlled by the data density controller 106 and the memory controller 108.

A subset of probes 904 is identified by a dotted line. The number of probes 908 within subset of probes 904 is controlled by the data density controller 106 and reflects the density of data storage desired by a user, such as a physical user or an application. This ability to accommodate flexible data density may be more fully appreciated with respect to FIG. 12 and FIG. 14.

Figure 12:
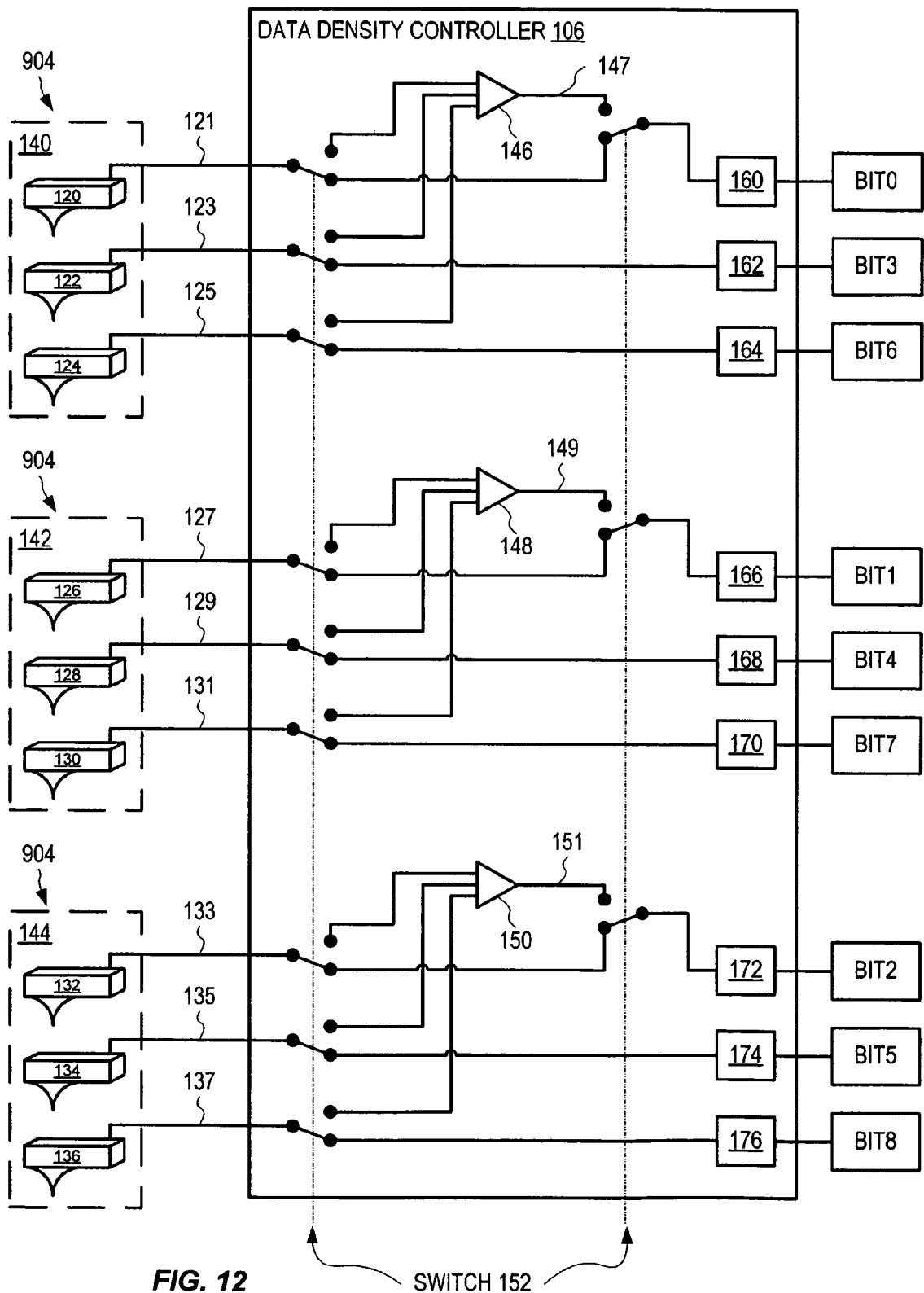
FIG. 12 is a schematic diagram illustrating one exemplary embodiment of the data density controller of FIG. 10 with two operating modes—high density and low density.
Figure 13:
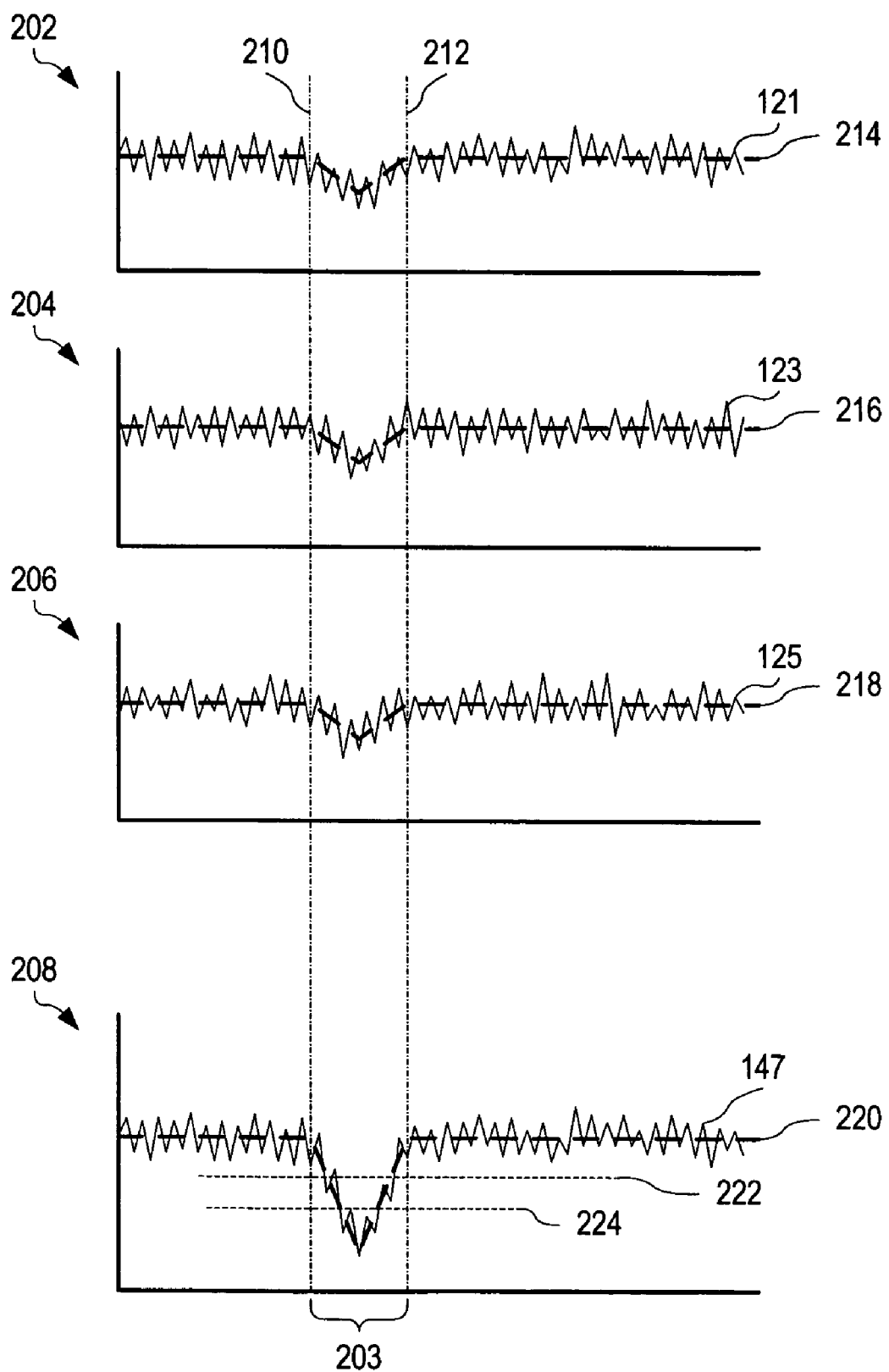
FIG. 13 presents a series of graphs illustrating exemplary read signals during a high speed read process.
Figure 14:
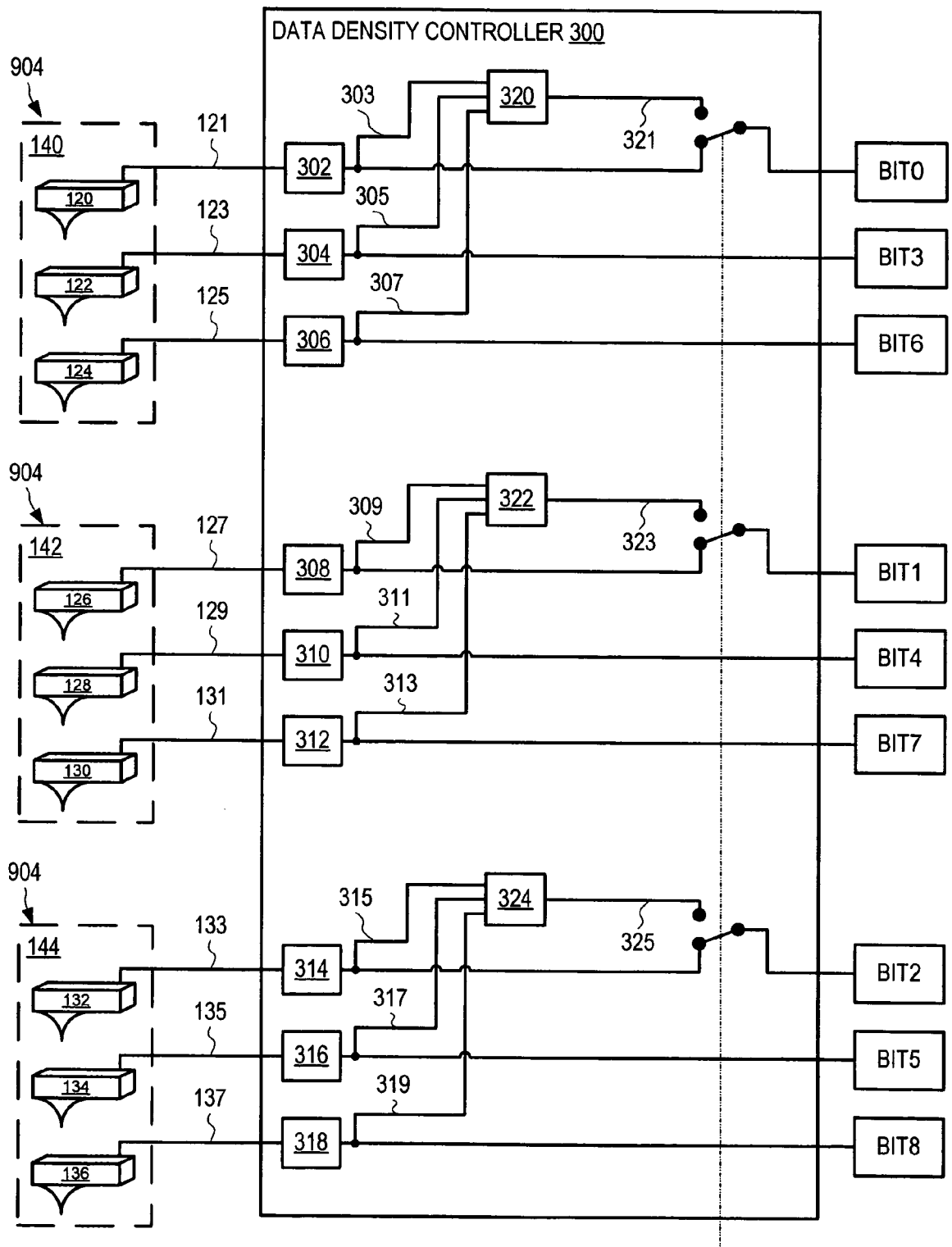
FIG. 14 is a block diagram showing one alternate embodiment of a data density controller that allows increased reading speed and/or improved data integrity.

FIG. 12 and FIG. 14 illustrate two exemplary embodiments of a data density controller such as data density controller 106, FIG. 3. Simply put, in a first embodiment (as shown in FIG. 12), data density controller 106 operates to sum read signals from probes 120–124, 126–130 and 132–136 of each subgroup of probes 140, 142 and 144, respectively, to improve the SNR of the summed read signal. Each probe 120–130 within a subgroup of probes 140–144 reads identical data (previously written to be identical). Threshold levels (e.g., threshold levels 222 and 224, FIG. 13) may then be used to determine a data value read from the summed read signal. With this improved SNR, the speed of reading may be increased, and/or data integrity may be improved.

In a second embodiment (as shown in FIG. 14), a data density controller 300 utilizes detector circuits 302 through 306, 308 through 312 and 314 through 318 to determine read data values for each probe 120–124, 126–130 and 132–136, respectively. Arbitration circuits 320, 322 and 324 are then used to determine a majority read data value from the read data values of each subgroup 140, 142 and 144, respectively. Each probe within a subgroup 140–144 reads identical data (previously written to be identical). With this arbitration system, data integrity may be improved, and/or the speed of reading may be increased.

FIG. 12 is a schematic diagram illustrating the first exemplary embodiment of data controller 106, FIG. 11, with two operating modes, high density and low density. In a first operating mode (high data density, normal speed read), a switch 152 of data density controller 106 is configured to connect probes 120, 122, 124, 126, 128, 130, 132, 134 and 136 to level detector circuits 160, 162, 164, 166, 168, 170, 172, 174 and 176, respectively. Logic level outputs from level detector circuits 160, 162, 164, 166, 168, 170, 172, 174 and 176 are connected to output bits BIT0, BIT3, BIT6, BIT1, BIT4, BIT7, BIT2, BIT5 and BIT8, respectively, for use within memory controller 108.

In this first mode, normal read speed is limited by the SNR of individual read signals 121, 123, 125, 127, 129, 131, 133, 135 and 137 from probes 120, 122, 124, 126, 128, 130, 132, 134 and 136, respectively. Probes 120, 122, 124, 126, 128, 130, 132, 134 and 136 write and read individual data bits in this first operating mode.

In a second operating mode (low data density and/or high speed read), data density controller 106 groups probes 120, 122, 124, 126, 128, 130, 132, 134 and 136 into three subgroups 140, 142 and 144. Subgroup 140 contains probes 120, 122 and 124. Subgroup 142 contains probes 126, 128 and 130. Subgroup 144 contains probes 132, 134 and 136. The probes within a given subset read or write identical data. The data read and written by the probes of one subgroup may be different from the data read and written by the probes of another subgroup. For example, probes 120, 122 and 124 of subgroup 140 may write and read data that differs from the data written and read by probes 126, 128 and 130 of subgroup 142.

More specifically, probes 120, 122 and 124 of subgroup 140 write and read identical data; probes 126, 128 and 130 of subgroup 142 write and read identical data; and probes 132, 134 and 136 of subgroup 144 write and read identical data. Thus, the data width of probe storage device 100 is reduced to three in this example (i.e., the number of subsets used by data density controller 106). In this second operational mode, data capacity of probe storage device 100 is reduced to ⅓ of the maximum capacity, since the number of subsets (3 in this example) divided by the number of probes (9 in this example) determines a ratio of usable capacity of probe storage device 100.

In this second operating mode, switch 152 connects read signals 121, 123 and 125 of probes 120, 122 and 124, respectively, to summing amplifier 146. Summing amplifier 146 sums signals 121, 123 and 125 to produce signal 147. Read signals 127, 129 and 131 of probes 126, 128 and 130, respectively, are connected to summing amplifier 148 that produces signal 149. Read signals 133, 135 and 137 of probes 132, 134 and 136 are connected to summing amplifier 150 that produces signal 151.

Switch 152 connects signals 147, 149 and 151 to level detector circuits 160, 166 and 172, respectively. Outputs from level detector circuits 160, 166 and 172 are output as BIT0, BIT1 and BIT2, respectively. In this second operational mode, data density controller 106 thus outputs three bits BIT0, BIT1 and BIT2 for each read cycle; BIT3, BIT4, BIT5, BIT6, BIT7 and BIT8 are not used.

With respect to these two exemplary modes of operation, the larger the subset of probes 904 (shown as subgroups 140, 142, 144) the larger the number of memory storage locations 112 containing substantially the same data. Likewise, the smaller the subset of probes 904, the smaller the number of memory storage locations 112 containing substantially the same data. Moreover, at the highest data density each subset of probes 904 contains a single probe 120.

Although FIG. 12 illustrates two different operational modes, it is understood and appreciated that the probe storage device 100 can provide a range of different data storage densities. Moreover, in at least one embodiment the number of probes in each group is selectable.

The data density selected for a write operation of data will be duplicated when a read request for that data is received by the probe storage device 100. The specification of a data density for the writing of a data element or block of data elements, does not imply that all subsequent data written to the probe storage device 100 will be at the same data density. More specifically the data density applied to a data stream written to the probe storage device 100 may be adjusted from one stream to the next.

In this second operating mode, summing amplifiers 146, 148 and 150 increase the SNR of signals 147, 149 and 151, respectively. Such increase in SNR advantageously improves the ability of the probe storage device 100 to properly read the intended data. Generally speaking, in any probe storage device, adverse conditions may arise where a single read/write device that operates to read or write data is damaged, or the data is damaged as it is provided to or received from the device. When such an adverse condition occurs, the likelihood of data loss is high. However, where multiple read/write devices—such as subset of probes 904—are reading or writing identical data, the effect of an adverse condition can be substantially and advantageously minimized as the unaffected probes can and will read and write correctly.

With subsets of probes 904 each containing a plurality of probes (e.g., probes 120, 122 and 124), the operational speed of probe storage device 100 may also be increased. More specifically, as a single probe moves faster and faster there is an increased chance that it may falter in the operation of reading or writing data. It is important to realize that the increased chance of falter is individualistic and is not compounded in selecting a subset of probes 904. By utilizing subset of probes 904 consisting of multiple probes 120, 122 and 124, the relative chance of falter for any specific probe is overshadowed by the proper operation of the remaining, properly functioning probes in the subset of probes 904. As a direct result, the relative speed of the array 104 may be increased.

FIG. 13 presents graphs 202, 204 and 206 illustrating exemplary read signals 121, 123 and 125, respectively, and a graph 208 that illustrates summed read signal 147. Each graph covers identical time periods during a high speed read process of the second operating mode selected for data density controller 106 as array 104 scans across array 102 of memory storage locations 112. A period 203, between lines 210 and 212, is shown in graphs 202, 204, 206 and 208 and represents a period where probes 120, 122 and 124 each read a '1' value (i.e., distal tips 902 of probes 120, 122 and 124 detect pits in array 102 of memory storage locations 112).

In graph 202, read signal 121 includes random noise that occurs during the read process, and line 214 indicates an ideal read signal without noise. Similarly, graph 204 shows read signal 123 with random noise and line 216 indicating an ideal read signal without noise, and graph 206 shows read signal 125 with random noise and line 218 indicating an ideal signal without noise. Graph 208 similarly features a line 220 representing an ideal read signal without noise. Because of the increased speed at which array 104 is scanned across array 102 of memory storage locations 112, the SNR of signals 121, 123 and 125 is insufficient to allow consistent detection of data within these signals on a stand alone basis. However, when these signals are summed, as shown by signal 147 in graph 208, the SNR increases, such that exemplary threshold levels 222 and 224 may be used to detect data within signal 147 with greater consistency. Thus, probe storage device 100 may advantageously operate with a faster read speed while maintaining data read integrity.

In one embodiment, memory controller 108 (including data density controller 106) may operate to adaptively select the number of probes 908 within each subset of probes 904 such that the SNR of signals 147, 149 and 151 are maintained above an operational threshold.

FIG. 14 is a block diagram showing one alternate embodiment of a data density controller 300 that allows increased reading speed. Data density controller 300 includes nine level detector circuits 302, 304, 306, 308, 310, 312, 314, 316 and 318 that determine logic levels (e.g., '0' or '1') for read signals 121, 123, 125, 127, 129, 131, 133, 135 and 137, respectively.

In a first operating mode (high data density, normal speed read), a switch 326 of data density controller 300 is configured to connect outputs of detector circuits 302, 304, 306, 308, 310, 312, 314, 316 and 318 to output bits BIT0, BIT3, BIT6, BIT1, BIT4, BIT7, BIT2, BIT5 and BIT8, respectively, for use within memory controller 108, for example. In this mode, speed of reading is limited by the SNR of read signals from probes 120, 122, 124, 126, 128, 130, 132, 134 and 136. Probes 120, 122, 124, 126, 128, 130, 132, 134 and 136 read individual data bits.

In a second operating mode (low data density and/or high speed read), data density controller 300 groups probes 120, 122, 124, 126, 128, 130, 132, 134 and 136 into three subgroups 140, 142 and 144. Subgroup 140 contains probes 120, 122 and 124. Subgroup 142 contains probes 126, 128 and 130. Subgroup 144 contains probes 132, 134 and 136.

More specifically, probes 120, 122 and 124 of subgroup 140 write and read identical data; probes 126, 128 and 130 of subgroup 142 write and read identical data; and probes 132, 134 and 136 of subgroup 144 write and read identical data. Thus, the data width of probe storage device 100 is reduced to three in this example (i.e., the number of subgroups used by data density controller 300). As noted above, the data read or written by one subgroup of probes may be different from the data read or written by another subgroup.

In this second operational mode, data capacity of probe storage device 100 is reduced to ⅓ of the maximum capacity, since the number of subsets (3 in this example) divided by the number of probes (9 in this example) determines a ratio of usable capacity of probe storage device 100. One advantage of grouping probes (e.g., into subgroups 140, 142 and 144) is that substantially identical data is stored in multiple locations within array 102 of memory storage locations 112. This redundant storage of data insures that a failure of one memory storage location 112, a failure of one probe 120 or excessive noise on one signal line does not result in lost data.

In the second operational mode, data density controller 300 detects read data within read signals from subsets of probes 140, 142 and 144 and determines the most probable data value. In one example, while reading data, read signals 121, 123 and 125 from probes 120, 122 and 124 of subgroup 140, are input to level detector circuits 302, 304 and 306, respectively. Level detector circuit 302 detects data within read signal 121 and generates a logic signal 303 that is input to an arbitration circuit 320. Level detector circuit 304 detects data within read signal 123 and generates a logic signal 305 that is input to arbitration circuit 320. Level detector circuit 306 detects data within read signal 125 and generates a logic signal 307 that is input to arbitration circuit 320.

Similarly, read signals 127, 129 and 131 from probes 126, 128 and 130 of subgroup 142, are input to level detector circuits 308, 310 and 312, respectively. Level detector circuit 308 detects data within read signal 127 and generates a logic signal 309 that is input to an arbitration circuit 322. Level detector circuit 310 detects data within read signal 129 and generates a logic signal 311 that is input to arbitration circuit 322. Level detector circuit 312 detects data within read signal 131 and generates a logic signal 313 that is input to arbitration circuit 322.

Similarly again, read signals 133, 135 and 137 from probes 132, 134 and 136 of subgroup 144, are input to level detector circuits 314, 316 and 318, respectively. Level detector circuit 314 detects data within read signal 133 and generates a logic signal 315 that is input to an arbitration circuit 324. Level detector circuit 316 detects data within read signal 135 and generates a logic signal 317 that is input to arbitration circuit 324. Level detector circuit 318 detects data within read signal 137 and generates a logic signal 319 that is input to arbitration circuit 324.

Arbitration circuit 320 generates a logic signal 321 representing the most probable data value read by probes 120, 122 and 124 of subgroup 140. For example, arbitration circuit 320 may determine the most probable data value using a majority voting system. Similarly, arbitration circuit 322 generates a logic signal 323 representing the most probable data value read by probes 126, 128 and 130 of subgroup 142. Similarly again, arbitration circuit 324 generates a logic signal 325 representing the most probable data value read by probes 132, 134 and 136 of subgroup 144.

As appreciated, in this second operational mode, data density controller 300 ignores erroneous read data caused, for example, by faltering of a minority number of probes within any one subgroup 140, 142 and 144. Switch 326 is configured to connect signals 321, 323 and 325 to output bits BIT0, BIT1 and BIT2, respectively.

In this second operational mode, data density controller 300 thus outputs three bits BIT0, BIT1 and BIT2 for each read cycle. Although the SNR of read signals 121, 123, 125, 127, 129, 131, 133, 135 and 137 is reduced by an increased scan speed of array 104 across array 102 of memory storage locations 112, errors resulting from the reduced SNR are removed by arbitration circuits 320, 322 and 324.

Figure 15:
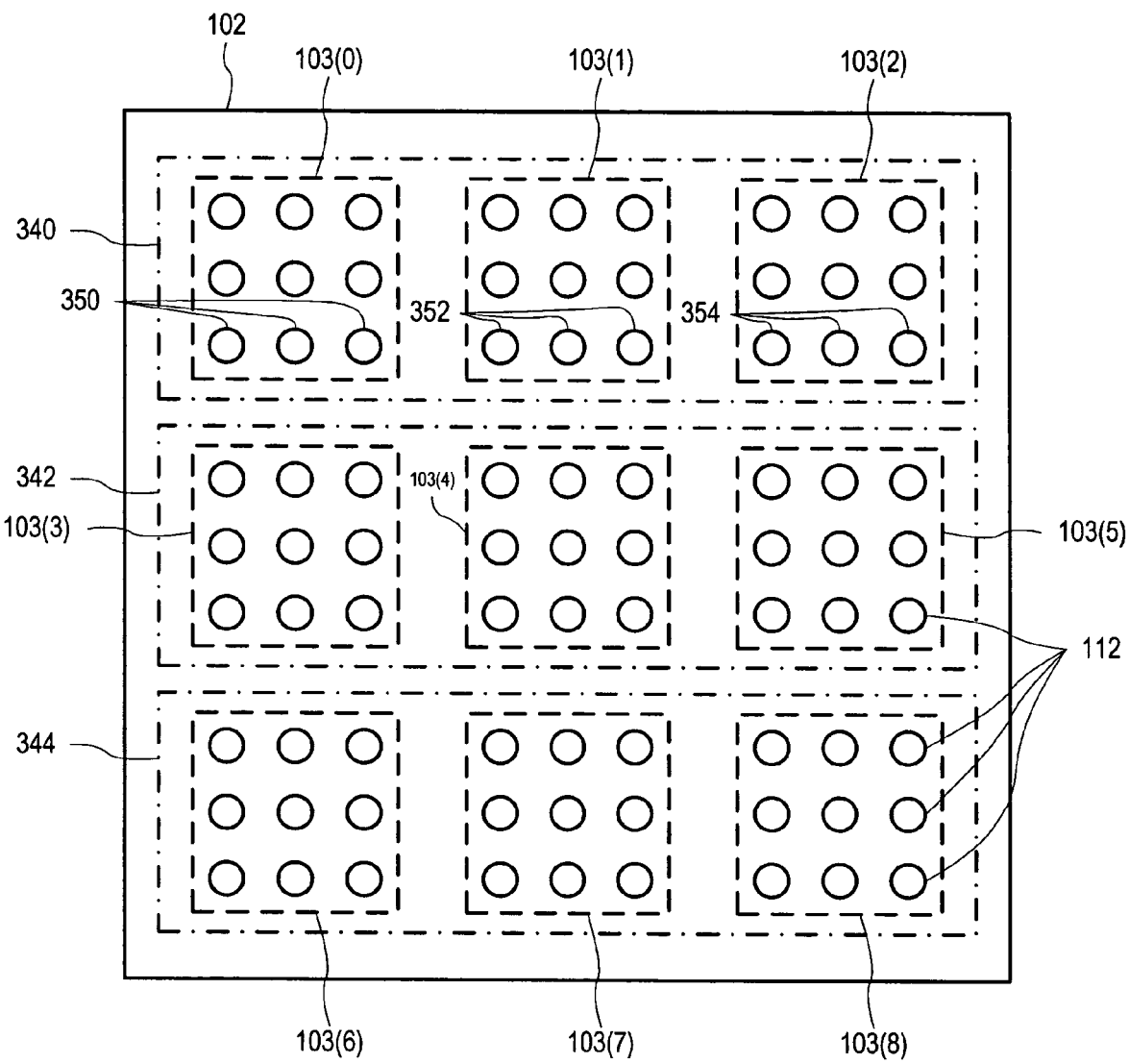
FIG. 15 is a block diagram illustrating one exemplary layout for the array of memory storage locations of FIG. 11.

FIG. 15 is a block diagram illustrating one exemplary layout for an array 102 of memory storage locations 112, FIG. 11. Array 102 of memory storage locations 112 is shown with nine sub-arrays 103(0), 103(1), 103(2), 103(3), 103(4), 103(5), 103(6), 103(7) and 103(8). Sub-arrays 103(0), 103(1), 103(2), 103(3), 103(4), 103(5), 103(6), 103(7) and 103(8) are accessible by probes 120, 122, 124, 126, 128, 130, 132, 134 and 136, respectively, as shown in FIG. 11.

As shown in FIGS. 12 and 14, probes 120, 122 and 124 may be grouped into subgroup 140, probes 126, 128 and 130 may be grouped into subgroup 142, and probes 132, 134 and 136 may be grouped into subgroup 144. Sub-arrays 103(0), 103(1) and 103(2) are similarly grouped into subset of storage locations 340 (shown in FIG. 15) when probes 120, 122 and 124 are grouped into subgroup 140. Subset storage locations 342 and 344 (shown in FIG. 15) similarly provide storage locations for probe subgroups 142 and 144.

As appreciated, sub-arrays 103(0)–103(8) of array 102 of memory storage locations 112 are grouped according to the physical location of subsets of probes 904 within array 104. Subsets of probes 904 of array 104 need not be adjacent to one another within array 104, and similarly, grouped sub-arrays 103(0)–103(8) of array 102 of memory storage locations 112, need not be adjacent to one another. In other words, probes 120, 122 and 124 are shown as physically sequential probes in FIG. 11, as well as members of the logical subgroup 140 in FIGS. 12 and 14. The depicted physical sequencing has been adopted for ease of discussion. The probes 120, 122 and 124 comprising logical subgroup 140 could be physically separated by other probes that are not members of subgroup 140.

In one example, when sub-arrays 103(0), 103(1) and 103(2) are grouped into subset of storage locations 340, the data written to memory storage locations 350 in sub-array 103(0), will parallel the data written to memory storage locations 352 of sub-array 103(1) and memory storage locations 354 of sub-array 103(2).

In at least one embodiment, data density controller 300 operates to group probes to provide data redundancy for improved error recovery. For example, arbitration circuits 320, 322 and 324 operate to provide improved data integrity as compared to probe storage devices without data density controller 300. Further, by providing improved error recovery within probe storage device 100, array 102 of memory storage locations 112 may be designed to have increased data density by making memory storage locations 112 smaller; array 104 may also be designed to have a greater number of probes 900. For example, probe 900 failures within array 104 do not make probe storage device 100 unusable.

In at least one embodiment, memory storage locations 112 of array 102, FIG. 11, may be divided into blocks for data organizational purposes. In one example, a first block includes sub-arrays 103(0), 103(1), 103(2), 103(3), 103(4) and 103(5) operating with subgroups 140, and 142 to store eighteen bits of data, and sub-arrays 103(6), 103(7) and 103(8) operating without grouping and each storing nine bits of data.

In one example, memory controller 108 may implement one or more allocation tables (stored within probe storage device 100) that indicate data density (i.e., probe and sub-array grouping) used for each block. If the data is written to a block using one data density, the data must be read from the block using the same data density.

Probe storage device 100 may operate with differing data densities and read access times, selectable on a block by block basis. In another example, an operating system may store files requiring fast access in blocks with a fast read speed (and a low data density). The operating system may store other files that are accessed less frequently in blocks with a maximum data density.

In another example, an operating system may store important files in blocks with a low data density such that probe falters do not result in data loss.

In one embodiment, probe storage device 100 and memory controller 108 (including data density controller 106) are constructed within a single package. In another embodiment, memory controller 108 and data density controller 106 are located external to probe storage device 100.

Changes may be made in the above methods and systems without departing from the scope thereof. It should thus be noted that the matter contained in the above description and/or shown in the accompanying drawings should be interpreted as illustrative, and not in a limiting sense. The following claims are intended to cover all generic and specific features described herein, as well as all statements of the scope of the present method and system, which, as a matter of language, might be said to fall therebetween.

What is claimed is:

1. A probe storage device comprising: an array of memory storage locations;
an array of probes proximate to the array of memory storage locations, each probe having a distal tip, each tip positioned within close proximity to a memory storage location, the probes movable relative to the array of memory storage locations; at least one data density controller coupled to the array of probes, the data density controller optionally grouping the probes into at least one subset of probes, each probe of a subset interacting identically and contemporaneously with a corresponding subset of memory storage locations.

2. The probe storage device of claim 1, wherein the array of probes is fixed and the array of memory storage locations is movable.

3. The probe storage device of claim 1, wherein the array of memory storage locations is fixed and the array of probes is movable.

4. The probe storage device of claim 1, wherein each probe is operable to write a data bit to a memory storage location.

5. The probe storage device of claim 1, wherein the larger the subset of probes, the larger the number of memory storage locations containing substantially the same data.

6. The probe storage device of claim 1, wherein the smaller the subset of probes, the greater the data density.

7. The probe storage device of claim 1, wherein each probe is operable to read a data bit from a memory storage location.

8. The probe storage device of claim 7, wherein the larger the subset of probes, the faster the read operation.

9. The probe storage device of claim 7, wherein a read signal from each probe of the subset of probes is summed to produce a higher signal to noise ratio.

10. The probe storage device of claim 1, wherein the probe storage device operates using thermal principles.

11. The probe storage device of claim 1, wherein the probe storage device operates using optical principles.

12. The probe storage device of claim 1, wherein the probe storage device operates using magnetic and thermal principles.

13. The probe storage device of claim 1, wherein the probe storage device operates using phase change principles.

14. The probe storage device of claim 1, wherein the larger the subset of probes, the greater the signal to noise ratio of a data transfer operation performed to transfer a data bit to or from a subset of memory storage locations.

15. The probe storage device of claim 1, wherein the number of probes of the subset of probes is adaptively selected to maintain a predetermined threshold signal to noise ratio.

16. The probe storage device of claim 1, wherein the number of probes in each group is selectable.

17. The probe storage device of claim 1, further comprising: one or more logical data blocks of one or more memory storage locations; an allocation table that defines the data density of each of the logical data blocks; and a memory controller operable to select a data density within the data density controller to access the memory storage locations for the one or more logical data blocks.

18. A probe storage device comprising: a memory storage media; an array of probes proximate to the memory storage media, the array of probes fixed relative to each other and movable relative to the memory storage media; at least one data density controller coupled to the array of probes, the data density controller grouping the probes into at least one subset of probes, each probe of the subset interacting identically and contemporaneously with the memory storage media.

19. The probe storage device of claim 18, wherein each probe has a distal tip positioned within close proximity to the memory storage media and operable to write to and read from the memory storage media.

20. The probe storage device of claim 18, wherein the smaller the subset of probes, the greater the data density.

21. The probe storage device of claim 18, wherein the probe storage device operates using thermal principles.

22. The probe storage device of claim 18, wherein the probe storage device operates using optical principles.

23. The probe storage device of claim 18, wherein the probe storage device operates using magnetic and thermal principles.

24. The probe storage device of claim 18, wherein the probe storage device operates using phase change principles.

25. The probe storage device of claim 18, wherein the number of probes of the subset of probes is adaptively selected to maintain a predetermined threshold signal to noise ratio.

26. The probe storage device of claim 18, wherein the memory storage media includes an array of memory storage locations.

27. The probe storage device of claim 25, wherein the array of probes is fixed and the array of memory storage locations is movable.

28. The probe storage device of claim 25, wherein the array of memory storage locations is fixed and the array of probes is movable.

29. The probe storage device of claim 25, wherein each probe is operable to write a data bit to a memory storage location.

30. The probe storage device of claim 25, wherein the larger the subset of probes, the larger the number of memory storage locations containing substantially the same data.

31. The probe storage device of claim 25, wherein each probe is operable to read a data bit from a memory storage location.

32. The probe storage device of claim 21, wherein the larger the subset of probes, the faster the read operation.

33. The probe storage device of claim 31, wherein the larger the subset of probes, the greater the signal to noise ratio of a data bit when read from a subset of memory storage locations.

* * * * *